US006549560B1

(12) United States Patent
Maiuzzo et al.

(10) Patent No.: US 6,549,560 B1
(45) Date of Patent: Apr. 15, 2003

(54) COMB LIMITER COMBINER FOR FREQUENCY-HOPPED COMMUNICATIONS

(75) Inventors: Michael A. Maiuzzo, Queenstown, MD (US); Shing T. Li, San Diego, CA (US); John W. Rockway, San Diego, CA (US); James H. Schukantz, San Diego, CA (US); Daniel W. Tam, San Diego, CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 08/868,473

(22) Filed: Jun. 3, 1997

(51) Int. Cl.[7] ............................ H04L 27/30; H04B 1/10

(52) U.S. Cl. ....................... 375/136; 375/132; 375/349; 375/350

(58) Field of Search ................................ 375/349, 350, 375/377, 316, 202, 260, 347, 267, 286, 132, 136; 455/295, 132, 65, 303, 306, 308, 307, 339, 269, 280, 283, 284, 286; 370/488, 497; 364/724.011; 708/300; 327/557

(56) References Cited

U.S. PATENT DOCUMENTS

| | | | | | |
|---|---|---|---|---|---|
| 3,112,452 | A | * | 11/1963 | Kirkpatrick | 375/349 |
| 3,585,311 | A | * | 6/1971 | Berkley et al. | 455/303 |
| 3,936,761 | A | * | 2/1976 | Jensen et al. | 327/557 |
| 4,998,290 | A | | 3/1991 | Olenick et al. | |
| 5,329,548 | A | | 7/1994 | Borg | |
| 5,386,435 | A | | 1/1995 | Cooper et al. | |
| 5,463,659 | A | | 10/1995 | Nealon et al. | |
| 5,471,663 | A | | 11/1995 | Davis | |
| 5,537,434 | A | | 7/1996 | Persson et al. | |
| 5,537,680 | A | * | 7/1996 | Bruno | 455/303 |
| 5,574,979 | A | | 11/1996 | West | |
| 5,592,179 | A | | 1/1997 | Windyka | |
| 5,613,234 | A | * | 3/1997 | Vella-Coleiro | 455/303 |

OTHER PUBLICATIONS

C. J. Savant Jr., et al., *Electronic Circuit Design, An Engineering Approach*, p. 43, 1987.*

* cited by examiner

*Primary Examiner*—Betsy L. Deppe
(74) *Attorney, Agent, or Firm*—Harvey Fendelman; Peter A. Lipovsky; Eric James Whitesell

(57) ABSTRACT

A comb limiter combiner for frequency-hopped communications includes an input signal coupler for coupling to a receiving antenna and distributing the antenna signal to a bank of input bandpass filters. The input bandpass filters have contiguous passbands that comprise the total receiver bandwidth. Each input bandpass filter is connected to a limiter having a threshold substantially equal to the limiting threshold of the receiver. Each limiter is connected to an output bandpass filter similar to the corresponding input bandpass filter to remove out-of-band intermodulation products generated by the limiter. The bank of output bandpass filters is connected to an output signal coupler for coupling to the front end of the receiver.

8 Claims, 2 Drawing Sheets

COMB LIMITER COMBINER FOR FREQUENCY-HOPPED COMMUNICATIONS

BACKGROUND OF THE INVENTION

The present invention relates to frequency-hopping filters for communications signals. More specifically, but without limitation thereto, the present invention relates to a filter to prevent strong interfering signals in nearby frequencies from overloading the amplifier and limiter stages in the front end of communications receivers.

Frequency-hopping, frequency-scanning wideband and ultrawideband communications receivers cannot employ simple narrowband preselector filters to protect amplifiers and limiters in receiver front ends from strong interference outside the communications signal bandwidth. Close proximity to multiple transmitters reduces the effective communications range of such receivers to almost zero. This range reduction has been shown to be due to intermodulation products in the front end of the receiver. Diodes near the receiver's antenna port used for power limiting or circuit switching act as mixers. The resulting intermodulation products affect virtually every communications channel in the receiver range.

Frequency-hopping filters have been under development for VHF and UHF frequency bands, but these are expensive and require switching in tandem with the receiver frequency.

A continuing need exists for a front end filter for a frequency-hopping receiver that is not dependent on knowledge of the frequency excursions of the transmitted signal.

SUMMARY OF THE INVENTION

The comb limiter combiner of the present invention is directed to overcoming the problems described above, and may provide further related advantages. No embodiment of the present invention described herein shall preclude other embodiments or advantages that may exist or become obvious to those skilled in the art.

A comb limiter combiner of the present invention comprises an input signal coupler for coupling to a receiving antenna and distributing the antenna signal to a bank of input bandpass filters. The input bandpass filters have contiguous passbands that comprise the total receiver bandwidth. Each input bandpass filter is connected to a limiter having a threshold substantially equal to the limiting threshold of the receiver. Each limiter is connected to an output bandpass filter similar to the corresponding input bandpass filter to remove out-of-band intermodulation products generated by the limiter. The bank of output bandpass filters is connected to an output signal coupler for coupling to the front end of the receiver.

An advantage of the comb limiter combiner is that intermodulation products are restricted to the passband of a single bandpass filter.

Another advantage is that a comb limiter combiner design requires no knowledge of the frequency excursions of the transmitted signal.

Yet another advantage is that a comb limiter combiner design requires no switching or control circuitry.

The features and advantages summarized above in addition to other aspects of the present invention will become more apparent from the description, presented in conjunction with the following drawings.

DESCRIPTION OF THE INVENTION

The following description is presented solely for the purpose of disclosing how the present invention may be made and used. The scope of the invention is defined by the claims.

Figure 1:
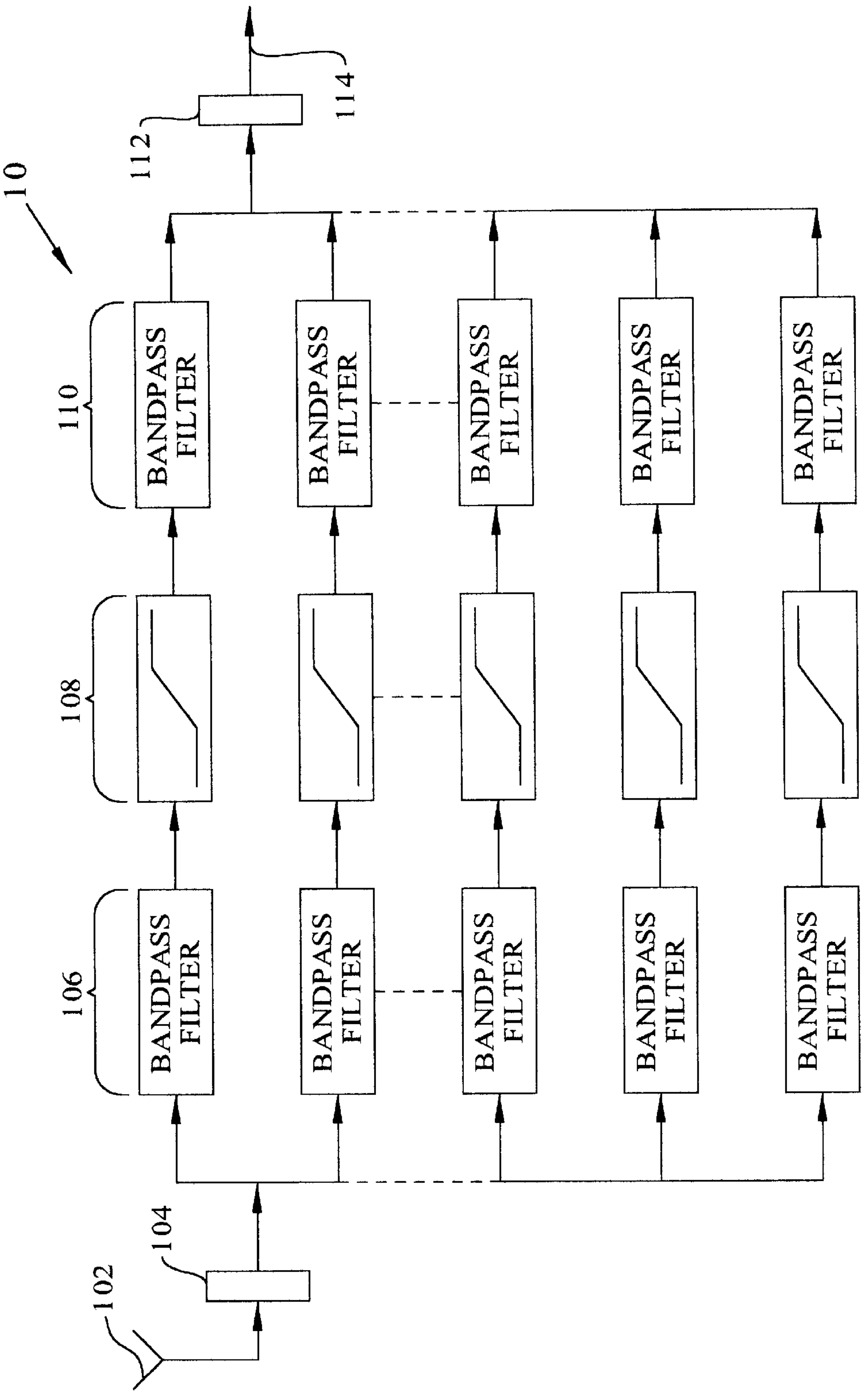
FIG. 1 is a diagram of a comb limiter combiner of the present invention.
Figure 2:
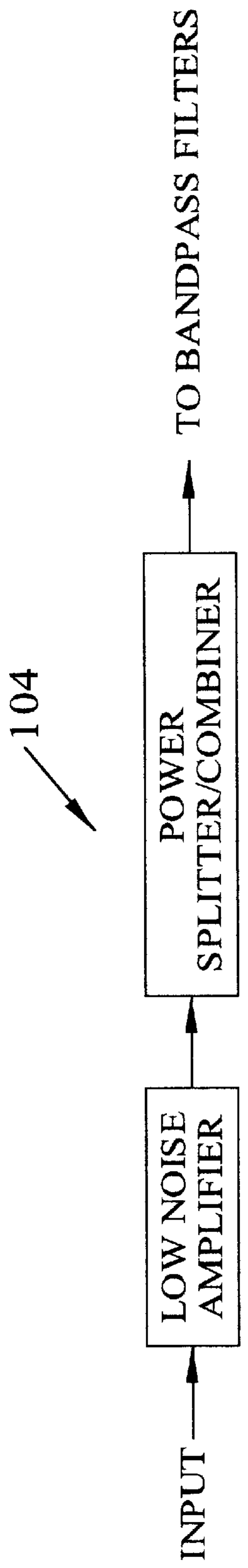
FIG. 2 is an exemplary input signal coupler.
Figure 3:
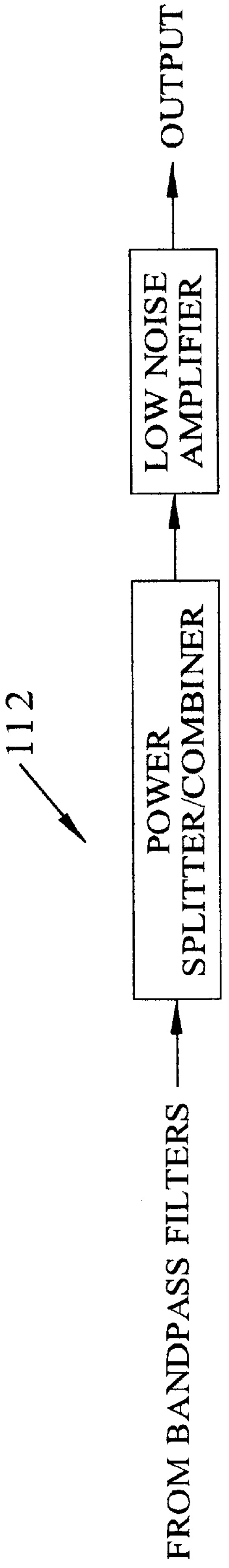
FIG. 3 is an exemplary output signal coupler.

FIG. 1 illustrates a design for a comb limiter combiner 10 connected to an antenna 102. Antenna 102, for example, a communications signal antenna, is connected to input signal coupler 104. Input signal coupler 104, for example, a power splitter/combiner coupled to a low-noise amplifier as shown in FIG. 2, distributes the antenna signal to input bandpass filters 106. Each input bandpass filter 106 is connected to a limiter 108. Limiters 108 are each connected to a corresponding output bandpass filter 110. The bank of output bandpass filters is connected to output signal coupler 112. Output signal coupler may be, for example, a power splitter/combiner coupled to a low-noise amplifier as shown in FIG. 3. Output 114 of output signal coupler 112 may be connected to a communications receiver front end, such as a digital communications receiver (not shown).

In operation, each input bandpass filter 106 spans a portion of a wideband or ultra-wideband reciever bandwidth. A receiver communications signal is coupled to filters 106 from antenna 102 through input signal coupler 104. The center frequencies and passbands of input bandpass filters 106 are selected to match the channel separation of the communications signal and the frequency separation of strong interfering signals. Each input bandpass filter 106 preferably has a bandwidth small enough so that the probability of two or more undesired signals occurring in the same passband is sufficiently low, and sufficient rolloff to avoid the generation of significant intermodulation products in adjacent passbands. To cover the entire communications signal bandwidth, the passbands of input bandpass filters 106 generally overlap at the 3 dB points. Limiters 108 clip peak amplitudes to avoid exceeding the linear response of the receiver front end, typically about +26 dBm. Limiters 108 may be, for example, limiting low-noise amplifiers. High-impedance FET amplifiers may be used in conjunction with limiters 108 to improve the signal-to-noise ratio. The clipped signals are input to output bandpass filters 110. By way of example, output bandpass filters 110 typically have the same center frequency, bandwidth, and frequency rolloff as the respective corresponding input bandpass filters 106 to prevent out-of-band intermodulation products generated by limiters 108 from being input to the receiver front end.

When one or more interfering signals occur in the bandpass of a single input bandpass filter 106, the corresponding limiter may be captured by the interference and the desired signal degraded through desensitization and/or intermodulation and other nonlinear effects. However, the degradation will be confined to the time periods when the interfering signal frequencies occur in the bandpass of the same input bandpass filter 106 passing the desired signal.

Because no switching is required to select frequencies, no switching transients are introduced into the desired signal. A mechanical switch may be used to bypass comb limiter combiner 10 used in a transceiver with a push-to-talk switch.

The comb limiter combiner of the present invention may be designed for virtually any frequency band according to well known techniques of filter and limiter design. The input and output signal couplers may be, for example, a multiport input wherein any incurred losses are compensated by selecting the gain of the limiters 108. Different types of bandpass filters may be used, including but not limited to cavity, stripline, and surface acoustic wave.

Other modifications, variations, and applications of the present invention may be made in accordance with the above teachings other than as specifically described to practice the invention within the scope of the following claims.

We claim:

1. A comb limiter combiner for frequency-hopped communications comprising:

an input signal coupler;

an output signal coupler;

a plurality of receiver channels wherein each receiver channel includes an input bandpass filter connected directly to said input signal coupler;

a limiter connected directly to said input bandpass filter for clipping peak amplitudes above a critical value; and an output bandpass filter connected directly to said limiter for attenuating intermodulation products, said output bandpass filter connected directly to said output signal coupler, wherein said comb limiter combiner receives a desired frequency-hopped signal on any one of said receiver channels at a time.

2. The comb limiter combiner of claim 1 further comprising a communications signal antenna coupled to said input signal coupler.

3. The comb limiter combiner of claim 1 further comprising a communications receiver front end coupled to said output signal coupler.

4. The comb limiter combiner of claim 3 wherein said communications receiver is a digital communications receiver.

5. The comb limiter combiner of claim 1 wherein said input bandpass filter and said output bandpass filter are of a type that is at least one of cavity, stripline, and surface acoustic wave.

6. The comb limiter combiner of claim 1 wherein said input bandpass filter and said output bandpass filter have substantially equal center frequencies, bandwidths, and frequency rolloffs wherein said input and output bandpass filters are matched to received a respective channel of a frequency-hopped transmitted signal.

7. The comb limiter combiner of claim 1 wherein said input signal coupler and said output signal coupler are power splitter/combiners coupled to low-noise amplifiers.

8. A comb limiter combiner for frequency-hopped communications comprising:

an input signal coupler;

a plurality of input bandpass filters connected directly to said input signal coupler;

a plurality of limiters respectively connected directly to said plurality of input bandpass filters for clipping peak amplitudes above a critical value;

a plurality of output bandpass filters corresponding to said input bandpass filters respectively connected directly to said plurality of limiters for attenuating intermodulation products;

and an output signal coupler connected directly to said plurality of output bandpass filters, wherein each said input bandpass filter and each said corresponding output bandpass filter have a substantially equal center frequency, bandwidth, and frequency rolloff, said input and output bandpass filters being matched to received a respective channel of a frequency-hopped transmitted signal, and wherein said plurality of input bandpass filters have contiguous frequency rolloffs that overlap at frequencies substantially equal to 3 dB points of said input bandpass filters, so that a desired frequency-hopped signal is received through any one pair of matched input and output bandpass filters at a time.

* * * * *